United States Patent
Henttonen et al.

(10) Patent No.: US 10,405,175 B2
(45) Date of Patent: Sep. 3, 2019

(54) CAPABILITY SIGNALING FOR DUAL CONNECTIVITY

(71) Applicant: NOKIA SOLUTIONS AND NETWORKS OY, Espoo (FI)

(72) Inventors: Tero Henttonen, Espoo (FI); Woonhee Hwang, Espoo (FI)

(73) Assignee: NOKIA SOLUTIONS AND NEWORKS OY, Espoo (FI)

( * ) Notice: Subject to any disclaimer, the term of this patent is extended or adjusted under 35 U.S.C. 154(b) by 42 days.

(21) Appl. No.: 15/524,143

(22) PCT Filed: Nov. 10, 2015

(86) PCT No.: PCT/EP2015/076209
§ 371 (c)(1),
(2) Date: May 3, 2017

(87) PCT Pub. No.: WO2016/078969
PCT Pub. Date: May 26, 2016

(65) Prior Publication Data
US 2017/0339555 A1 Nov. 23, 2017

Related U.S. Application Data

(60) Provisional application No. 62/080,490, filed on Nov. 17, 2014.

(51) Int. Cl.
*H04W 8/24* (2009.01)
*H04W 76/15* (2018.01)
*H04W 74/08* (2009.01)

(52) U.S. Cl.
CPC ........... *H04W 8/245* (2013.01); *H04W 76/15* (2018.02); *H04W 74/0833* (2013.01)

(58) Field of Classification Search
CPC . H04W 8/245; H04W 76/15; H04W 74/0833; H04W 24/08; H04W 24/10
See application file for complete search history.

(56) References Cited

U.S. PATENT DOCUMENTS

2007/0224990 A1 9/2007 Edge et al.
2014/0241317 A1* 8/2014 Jamadagni ............ H04L 5/0032 370/331

(Continued)

FOREIGN PATENT DOCUMENTS

EP 2 787 763 A1 10/2014
EP 2 947 936 A1 11/2015
WO WO 2014/112001 A1 7/2014

OTHER PUBLICATIONS

International Search Report & Written Opinion dated Feb. 8, 2016 corresponding to International Patent Application No. PCT/EP2015/076209.

(Continued)

*Primary Examiner* — Benjamin H Elliott, IV
(74) *Attorney, Agent, or Firm* — Squire Patton Boggs (US) LLP

(57) ABSTRACT

Systems, methods, apparatuses, and computer program products for user equipment (UE) capability signaling for dual connectivity (DC) are provided. One method may include transmitting to at least one UE, by a network node, a message comprising a flag indicating that the apparatus supports dual connectivity and/or wants to receive UE capability indications of DC support. The method further includes, based on the presence of the flag, receiving, from the at least one UE, the dual connectivity capabilities of the at least one UE.

13 Claims, 4 Drawing Sheets

```
UE-EUTRA-Capability-v12xy-IEs ::=   SEQUENCE {
    pdcp-Parameters-v12xy              PDCP-Parameters-v12xy              OPTIONAL,
    phyLayerParameters-v12xy           PhyLayerParameters-v12xy           OPTIONAL,
    rf-Parameters-v12xy                RF-Parameters-v12xy                OPTIONAL,
    rlc-Parameters-r12                 RLC-Parameters-r12                 OPTIONAL,
    ue-BasedNetwPerfMeasParameters-v12xy  UE-BasedNetwPerfMeasParameters-v12xy  OPTIONAL,
    ue-Category-v12xy                  INTEGER (0)                        OPTIONAL,
    measParameters-v12xy               MeasParameters-v12xy               OPTIONAL,
    nonCriticalExtension               SEQUENCE {}                        OPTIONAL
}

PDCP-Parameters-v12xy ::=    SEQUENCE {
    drb-TypeSplit-r12               ENUMERATED {supported}      OPTIONAL,
    drb-TypeSCG-r12                 ENUMERATED {supported}      OPTIONAL
}

RF-Parameters-v12xy ::=      SEQUENCE {
    supportedBandCombination-v12xy       SupportedBandCombination-v12xy       OPTIONAL,
    supportedBandCombinationAdd-v12xy    SupportedBandCombinationAdd-v12xy    OPTIONAL
}

SupportedBandCombination-v12xy ::= SEQUENCE (SIZE (1..maxBandComb-r10)) OF BandCombinationParameters-v12xy SupportedBandCombinationAdd-v12xy ::= SEQUENCE (SIZE (1..maxBandComb-r11)) OF BandCombinationParameters-v12xy BandCombinationParameters-v12xy ::= SEQUENCE {
    dc-Support-r12           SEQUENCE {
        supported                SEQUENCE {
            asynchronous             ENUMERATED {supported}     OPTIONAL
        }                                                       OPTIONAL
    }
}
```

(56) References Cited

U.S. PATENT DOCUMENTS

| | | | |
|---|---|---|---|
| 2016/0066362 A1* | 3/2016 | Ohta | H04W 16/32 370/331 |
| 2016/0212645 A1* | 7/2016 | Uemura | H04W 24/10 |
| 2016/0270139 A1* | 9/2016 | Rahman | H04W 56/00 |
| 2017/0118658 A1* | 4/2017 | Hwang | H04W 76/10 |
| 2017/0264562 A1* | 9/2017 | Yi | H04W 80/02 |
| 2017/0339555 A1* | 11/2017 | Henttonen | H04W 8/245 |

OTHER PUBLICATIONS

3GPP TR 36.842 V1.0.0 (Nov. 2013), Technical Report, 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), Nov. 2013, 68 pages.

3GPP TS 36.321 V12.3.0 (Sep. 2014), Technical Specification, 3rd Generation Partnership Project; Technical Specification Group Radio Access Network; Evolved Universal Terrestrial Radio Access (E-UTRA); Medium Access control (MAC) protocol specification (Release 12), Sep. 2014, 57 pages.

Ericsson, "Network-requested CA Band Combination Capability Signalling," Change Request; R2-142893, 3GPP TSG-RAN WG2 Meeting #86, Seoul, South Korea, Mar. 19-23, 2014, 20 pages.

Ericsson, "Network-requested CA Band Combination Capability Signalling," Change Request; R2-142894, 3GPP TSG-RAN WG2 Meeting #86, Seoul, South Korea, Mar. 19-23, 2014, 20 pages.

Ericsson, "Network-requested CA Band Combination Capability Signalling," Change Request; R2-142895, 3GPP TSG-RAN2 Meeting #86, Seoul, South Korea, May 19-23, 2014.

Ericsson, "Network-requesed CA Band Combination Capability Signalling," Change Request; R2-142896, 3GPP TSG-RAN2 Meeting #86, Seoul, South Korea, May 19-23, 2014.

Qualcomm Incorporated, "UE Capabilities for DUal Connectivity," R2-14450; 3GPP TSG-RAN WG2 Meeting #87bis, Shanghai, China, Oct. 6-10, 2014.

NTT Docomo, Inc. et al., "New Work Item Description: Dual Connectivity for LTE—Core Part," RP-132069, 3GPP TSG-RAN Meeting #62, Busan, Korea, Dec. 3-6, 2013; whole document (Core, Feature and Performance Part).

Communication pursuant to Article 94(3) EPC issued in corresponding European Patent Application No. 15793797.0, dated May 15, 2019.

* cited by examiner

```
UE-EUTRA-Capability-v12xy-IEs ::=   SEQUENCE {
    pdcp-Parameters-v12xy               PDCP-Parameters-v12xy                       OPTIONAL,
    phyLayerParameters-v12xy            PhyLayerParameters-v12xy                    OPTIONAL,
    rf-Parameters-v12xy                 RF-Parameters-v12xy                         OPTIONAL,
    rlc-Parameters-r12                  RLC-Parameters-r12                          OPTIONAL,
    ue-BasedNetwPerfMeasParameters-v12xy   UE-BasedNetwPerfMeasParameters-v12xy     OPTIONAL,
    ue-Category-v12xy                   INTEGER (0)                                 OPTIONAL,
    measParameters-v12xy                MeasParameters-v12xy                        OPTIONAL,
    nonCriticalExtension                SEQUENCE {}                                 OPTIONAL
}

PDCP-Parameters-v12xy ::=       SEQUENCE {
    drb-TypeSplit-r12                   ENUMERATED {supported}          OPTIONAL,
    drb-TypeSCG-r12                     ENUMERATED {supported}          OPTIONAL
}

RF-Parameters-v12xy ::=         SEQUENCE {
    supportedBandCombination-v12xy      SupportedBandCombination-v12xy              OPTIONAL,
    supportedBandCombinationAdd-v12xy   SupportedBandCombinationAdd-v12xy           OPTIONAL
}

SupportedBandCombination-v12xy ::= SEQUENCE (SIZE (1..maxBandComb-r10)) OF BandCombinationParameters-
v12xy SupportedBandCombinationAdd-v12xy ::= SEQUENCE (SIZE (1..maxBandComb-r11)) OF
BandCombinationParameters-v12xy BandCombinationParameters-v12xy ::= SEQUENCE {
    dc-Support-r12                  SEQUENCE {
        supported                       SEQUENCE {
            asynchronous                    ENUMERATED {supported}          OPTIONAL
        }                                                                   OPTIONAL
    }
}
```

Fig. 3

CAPABILITY SIGNALING FOR DUAL CONNECTIVITY

CROSS REFERENCE TO RELATED APPLICATIONS

This application claims priority to U.S. provisional application No. 62/080,490, filed on Nov. 17, 2014. The entire contents of this earlier filed application are hereby incorporated by reference in its entirety.

BACKGROUND

Field

Embodiments of the invention may generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and most of the RNC functionalities are contained in the enhanced Node B (eNodeB or eNB).

Long Term Evolution (LTE) or E-UTRAN refers to improvements of the UMTS through improved efficiency and services, lower costs, and use of new spectrum opportunities. In particular, LTE is a 3rd generation partnership project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high-capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while keeping the backward compatibility.

One the key features of LTE-A is carrier aggregation, which allows for increasing the data rates through aggregation of two or more LTE carriers residing in the same eNB. Dual connectivity (DC), where carrier aggregation is done over two eNBs may be considered as a generalization of carrier aggregation to allow usage of carrier aggregation in cases where it would otherwise not be possible.

SUMMARY

One embodiment is directed to an apparatus including at least one processor and at least one memory including computer program code. The at least one memory and computer program code are configured, with the at least one processor, to cause the apparatus at least to transmit, to at least one UE, a message comprising a flag indicating that the apparatus supports dual connectivity and/or indicate that the apparatus would like to receive UE capability indications of DC support, and, based on the presence of the flag, to receive, from the at least one UE, the dual connectivity capabilities of the at least one UE.

The at least one memory and computer program code are further configured, with the at least one processor, to cause the apparatus at least to receive a capability indication of split/SCG bearer support allowing the apparatus to know whether the at least one UE supports dual connectivity in any band. The message further comprises a request for frequency bands used for dual connectivity by the apparatus. When the message comprises the requested band lists, the at least one memory and computer program code are further configured, with the at least one processor, to cause the apparatus at least to receive dual connectivity capabilities of the at least one UE for the requested frequency bands.

Another embodiment is directed to a method including transmitting to at least one UE, by a network node, a message comprising a flag indicating that the network supports dual connectivity and/or indicating that the network would like to receive UE capability indications of DC support. The method further includes, based on the presence of the flag, receiving, from the at least one UE, the dual connectivity capabilities of the at least one UE.

The receiving may further comprise receiving a capability indication of split/SCG bearer support allowing the network node to know whether the at least one UE supports dual connectivity in any band. The transmitting may further comprise transmitting the message comprising a request for frequency bands used for dual connectivity by the network node. When the message comprises the requested band lists, the method may further comprise receiving dual connectivity capabilities of the at least one UE for the requested frequency bands.

Another embodiment is directed to an apparatus including means for transmitting to at least one UE a message comprising a flag indicating that the apparatus supports dual connectivity and/or indicating that the apparatus would like to receive UE capability indications of DC support. The apparatus may further include, based on the presence of the flag, means for receiving, from the at least one UE, the dual connectivity capabilities of the at least one UE.

Another embodiment is directed to a computer program, embodied on a non-transitory computer readable medium, the computer program configured to control a processor to perform a process. The process may include transmitting to at least one UE a message comprising a flag indicating that the apparatus supports dual connectivity and/or would like to receive UE capability indications of DC support, and, based on the presence of the flag, receiving, from the at least one UE, the dual connectivity capabilities of the at least one UE.

Another embodiment is directed to an apparatus including at least one processor and at least one memory including computer program code. The at least one memory and computer program code are configured, with the at least one processor, to cause the apparatus at least to receive a message, from a network node, the message comprising a flag indicating that the network supports dual connectivity and/or indicating that the network would like to receive UE capability indications of DC support. Based on the presence of the flag, the at least one memory and computer program code are further configured, with the at least one processor, to cause the apparatus at least to transmit, to the network, the dual connectivity capabilities of the apparatus.

The at least one memory and computer program code may be further configured, with the at least one processor, to cause the apparatus at least to transmit a capability indication of split/SCG bearer support allowing the network to know whether the apparatus supports dual connectivity in any band. The message may further comprise a request for frequency bands used for dual connectivity. When the message from the network includes the requested band lists, the at least one memory and computer program code may be further configured, with the at least one processor, to cause the apparatus at least to transmit the dual connectivity capabilities of the apparatus for the requested frequency bands.

Another embodiment is directed to a method including receiving, by a user equipment, a message from a network node, wherein the message comprises a flag indicating that the network supports dual connectivity and/or indicating that the network would like to receive UE capability indications of DC support. Based on the presence of the flag, the method may also include transmitting, to the network, the dual connectivity capabilities of the user equipment.

The transmitting may further comprise transmitting a capability indication of split/SCG bearer support allowing the network to know whether the user equipment supports dual connectivity in any band. The message may further comprise a request for frequency bands used for dual connectivity. When the message from the network includes the requested band lists, the method may further comprise transmitting the dual connectivity capabilities of the apparatus for the requested frequency bands.

Another embodiment is directed to an apparatus including means for receiving a message from a network node, wherein the message comprises a flag indicating that the network supports dual connectivity and/or indicating that the network would like to receive UE capability indications of DC support. Based on the presence of the flag, the apparatus may also include means for transmitting, to the network, the dual connectivity capabilities of the apparatus.

Another embodiment is directed to a computer program, embodied on a non-transitory computer readable medium. The computer program may be configured to control a processor to perform a process. The process may include receiving a message from a network node, wherein the message comprises a flag indicating that the network supports dual connectivity and/or indicating that the network would like to receive UE capability indications of DC support. The process may also include, based on the presence of the flag, transmitting, to the network, the dual connectivity capabilities of the user equipment.

BRIEF DESCRIPTION OF THE DRAWINGS

For proper understanding of the invention, reference should be made to the accompanying drawings, wherein:

FIG. 3 illustrates the defined DC capabilities in radio resource control (RRC);

DETAILED DESCRIPTION

Figure 1:
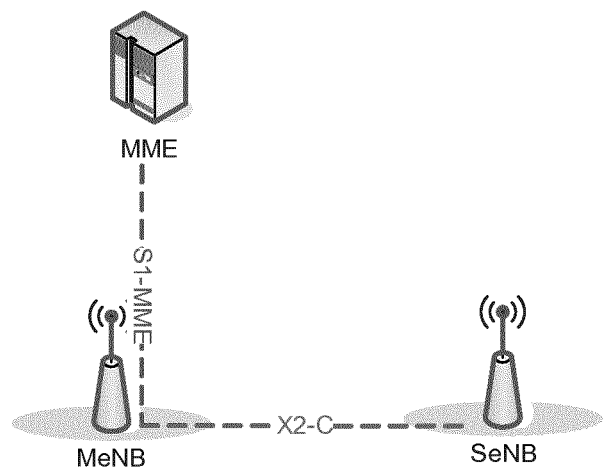
FIG. 1 illustrates a block diagram of a system depicting a C-Plane connectivity architecture for DC, according to an embodiment.

It will be readily understood that the components of the invention, as generally described and illustrated in the figures herein, may be arranged and designed in a wide variety of different configurations. Thus, the following detailed description of some embodiments of systems, methods, apparatuses, and computer program products for UE capability signaling for dual connectivity (DC), as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

As will be discussed in detail below, some embodiments may relate to LTE and in particular to Dual Connectivity capabilities within the topic of Small Cell Enhancements. A problem being looked into is that currently a UE is not aware whether a network supports Dual Connectivity, so a UE will always provide the information relating to its Dual Connectivity capability. As the information relating to a UE's capability may be large, transmitting all this information (i.e., Dual Connectivity capability) when it is not required, will decrease the efficiency of the network. Certain embodiments provide a mechanism to efficiently provide the information to the network when the network can support a Dual Connectivity capability. For example, one embodiment is configured to include, in a message sent to the UE, an additional flag relating to a Dual Connectivity capability. If this flag is present, a UE will provide its supported Dual Connectivity capabilities according to the indication. If not, then the UE will not provide its Dual Connectivity capabilities any differently than normally.

For example, in one embodiment, the flag may be tied to a UE capability query sent from the network, such that, when the UE receives the request query for capabilities, the flag will indicate to the UE that subset of capabilities that are requested. If the flag is not present, the UE may, in some embodiments, provide the capabilities as per normal UE capability indications.

In one example embodiment, in order to reduce the amount of information data relating to the Dual Connectivity capabilities of the UE that are transmitted to the network, the message transmitted may also include a request for the frequency bands used for Dual Connectivity. The UE will then only transmit its Dual Connectivity capabilities for the requested frequencies.

As introduced above, embodiments of the invention relate to small cell enhancement (SCE), a study item in 3GPP Rel-12, which is captured in TR36.842. SCE mainly targets local area deployment which can support high data rates for UE via small cells. Some embodiments may specifically apply where dual connectivity mode is used, whereby small cells are anchored by a macro eNB and these small cells are assigned local cell identifiers (IDs) which may be unique under the anchor eNB (these local cell IDs may not be unique across the set of anchor eNBs within a system). A Dual Connectivity working item (RP-132069) was also started based on the outcome of the study item discussed above.

In an embodiment, dual connectivity (DC) may be considered to be the mode of operation of a UE in RRC_CONNECTED, configured with a Master Cell Group (MCG) and a Secondary Cell Group (SCG). For instance, dual connectivity (DC) mode may refer to when one UE has two radio connections with two radio access points, for example one macro and one small cell eNB.

Figure 2:
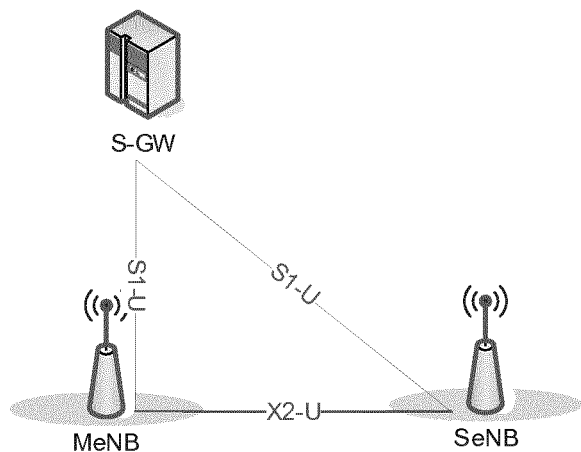
FIG. 2 illustrates a block diagram of a system depicting a U-Plane connectivity architecture for DC, according to an embodiment.

FIG. 1 illustrates a block diagram of a system depicting a C-Plane connectivity architecture for DC, according to an embodiment. In particular, FIG. 1 illustrates a mobility management entity (MME) and eNBs, master eNB (MeNB) and secondary eNB (SeNB), which may be involved in DC. FIG. 2 illustrates a block diagram of a system depicting a U-Plane connectivity architecture for DC, according to an embodiment. In particular, FIG. 2 illustrates the serving gateway (S-GW) and eNBs, MeNB and SeNB, which may be involved in DC.

It has been agreed that upon PSCell (primary cell of SeNB) configuration and/or reconfiguration the UE shall initiate access to the SeNB using the new PSCell configuration using the physical random access channel (PRACH) in DC. The random access (RA) procedure details may follow the existing RA procedure for PCell (including support for both contention and non-contention based RA procedures, as specified in TS 36.321).

To indicate its support of DC, the UE may need to signal DC capability to network and the following agreements were made during RAN2 #87bis meeting:
1. Define SCG and split bearer capabilities per UE
2. One bit per band combination indicating support for synchronous DC:
   2a. For synchronized case there is one bit per band combination with two or more entries (inter-band and non-contiguous intra-band) which indicates whether the UE is able to perform DC across the band entries (not within a band entry).
   2b. For synchronized case there is one bit per band combination with one entry and class C which indicates whether the UE is able to perform intra-band contiguous DC. (FFS for other classes)
3. One bit per band combination indicating support for asynchronous DC (FFS for more than two band entries in case of async):
   3a. For asynchronized case there is one bit per band combination with two band entries (inter-band and non-contiguous intra-band) which indicates whether the UE is able to perform DC across the band entries (not within a band entry).
   3b. For non-synchronized case there is one bit per band combination with one entry for class C which indicates whether the UE is able to perform intra-band contiguous DC. (FFS for other classes).
   2 bits per band combination for sync and a-sync respectively (not considering the FFSs).
6. A UE supporting asynchronous case for a band combination shall also support synchronous case for that band combination.

UE radio capability indication—message size may be quite large. Moreover, when DC capability is provided per band combination, it will exponentially increase the size of UE radio capability indication—message. Since, currently, the UE does not know whether the network supports DC or not, the UE will always provide the DC UE capabilities even when the network does not support this feature. In view of the above, an embodiment of the invention provides an efficient way to provide DC related UE capability to the network.

The DC capabilities in the radio resource control (RRC) CR are defined, as shown in FIG. 3. While the structure of the DC capabilities is not yet fixed and may still change slightly, it is expected to retain the division into two parts: DC architecture support, and DC band combinations support. The former is small but the latter can become very large.

According to an embodiment, when the network requests band combination for carrier aggregation (CA) in the UE capability enquiry, the network also indicates whether the band requested frequency band lists are applicable to DC as well. In one embodiment, only when the network indicates that the request frequency band lists are applicable to DC, the UE will provide DC related capability. Otherwise, the UE does not provide DC related capabilities to the network. Also, in an embodiment, if the network indicates that the requested band lists are applicable to DC, the UE provides DC capability only for those band combination(s) listed in the requested frequency band list in the UE capability enquiry. In any case, the UE may still provide the capability indication of split/SCG bearer support (i.e., the DC architecture support), thereby allowing the network to understand whether the UE supports DC in some band combination even in case the support for DC is not inputted for any band combinations by the UE.

In one example embodiment, a DC capability request flag is included, by the network, in the UECapabilityEnquiry message. In this embodiment, if this flag is not included in the UECapabilityEnquiry, the UE may not be allowed to send DC related capabilities. If the flag is included in the UECapabilityEnquiry and requestedFrequencyBands-r11 is included, the UE may provide DC capabilities only for those band combination with the bands listed in requestedFrequencyBands-r11. If requestedFrequencyBands-r11 is not included but DC capability request flag is included, the UE may provide DC capabilities for all band combination that the UE supports.

Embodiments of the invention may provide several advantages. For example, one advantage may include that, if the network does not support DC, the UE does not need to provide DC related UE capability unnecessarily and the UE capability size does not need to increase to accommodate DC capability indication unnecessarily. Also, by providing the capability to include the requested frequency band list, even DC capability reporting can be reduced as the UE does not need to include a DC capability that the network is not interested in. And since the UE always provides the split/SCG bearer support indications, the network will always know whether the UE supports DC or not even if the band combination support indications are not included in the currently stored UE capability information.

Figure 4A:
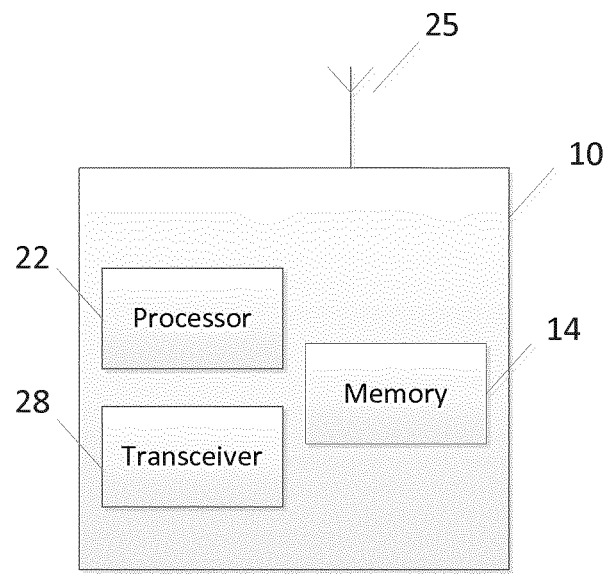
FIG. 4a illustrates a block diagram of an apparatus, according to one embodiment.

FIG. 4a illustrates an example of an apparatus 10 according to an embodiment. In an embodiment, apparatus 10 may be a node, host, or server in a communications network or serving such a network, such as a base station or eNB in LTE. It should be noted that one of ordinary skill in the art would understand that apparatus 10 may include components or features not shown in FIG. 4a.

As illustrated in FIG. 4a, apparatus 10 includes a processor 22 for processing information and executing instructions or operations. Processor 22 may be any type of general or specific purpose processor. While a single processor 22 is shown in FIG. 4a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. Transceiver 28 may include means for transmitting information, messages or other data, as well as means for receiving information messages or other data. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a network node, such as a base station in a communications network or an eNB in LTE. In this embodiment, apparatus 10 may be controlled by memory 14 and processor 22 to transmit, to one or more UEs, a message comprising a flag indicating that the network supports dual connectivity and/or indicating that the network would like to receive UE capability indications of DC support. It should be noted that, in some embodiments, the network may support dual connectivity; however, in other embodiments, the network may not necessarily support dual connectivity by itself, but it may support understanding the DC capability indications. Based on the presence of the flag, apparatus 10 may be controlled by memory 14 and processor 22 to receive, from the one or more UEs, the dual connectivity capabilities of the UEs. For example, in one embodiment, apparatus 10 may be controlled by memory 14 and processor 22 to receive a capability indication of split/SCG bearer support allowing the network to know whether the UE(s) support dual connectivity in any band.

According to an embodiment, the message transmitted to the UE(s) may further include a request for frequency bands used for dual connectivity. In other words, apparatus 10 may indicate to the UE(s) the requested band lists that are applicable to dual connectivity. In an embodiment, when the message to the UEs includes the requested band lists, apparatus 10 may be controlled by memory 14 and processor 22 to receive dual connectivity capabilities of the UEs for just the requested frequency bands.

Figure 4B:
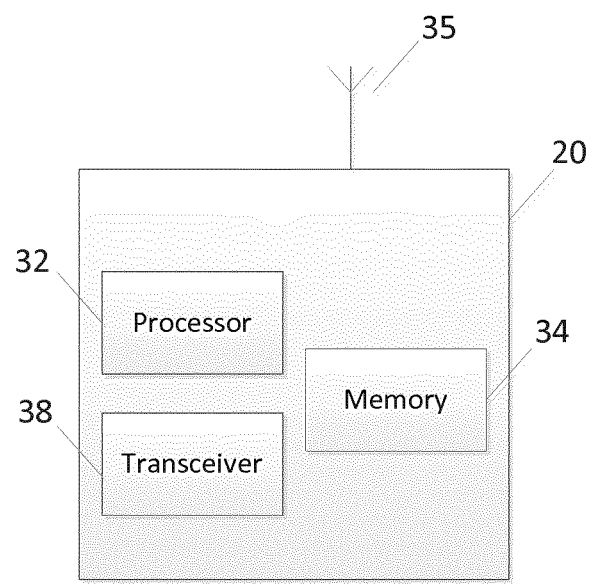
FIG. 4b illustrates a block diagram of an apparatus, according to another embodiment.

FIG. 4b illustrates an example of an apparatus 20 according to another embodiment. In an embodiment, apparatus 20 may be a mobile device in a communications network, such as a UE in LTE. It should be noted that one of ordinary skill in the art would understand that apparatus 20 may include components or features not shown in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. Transceiver 38 may include means for transmitting information, messages or other data, as well as means for receiving information messages or other data. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a mobile device in a communications network, such as a UE in LTE. In this embodiment, apparatus 20 may be controlled by memory 34 and processor 32 to receive a message, from a network node, comprising a flag indicating that the network supports dual connectivity and/or indicating that the network would like to receive UE capability indications of DC support. Based on the presence of the flag, apparatus 20 may be controlled by memory 34 and processor 32 to transmit, to the network, the dual connectivity capabilities of the apparatus 20. In one embodiment, apparatus 20 may be controlled by memory 34 and processor 32 to transmit a capability indication of split/SCG bearer support allowing the network to know whether the UE(s) support dual connectivity in any band.

According to an embodiment, the message received from the network may further include a request for frequency bands used for dual connectivity. In other words, the network may indicate to apparatus 20 the requested band lists that are applicable to dual connectivity. In an embodiment, when the message from the network includes the requested band lists, apparatus 20 may be controlled by memory 34 and processor 32 to transmit the dual connectivity capabilities of the apparatus 20 for just the requested frequency bands.

Figure 5A:
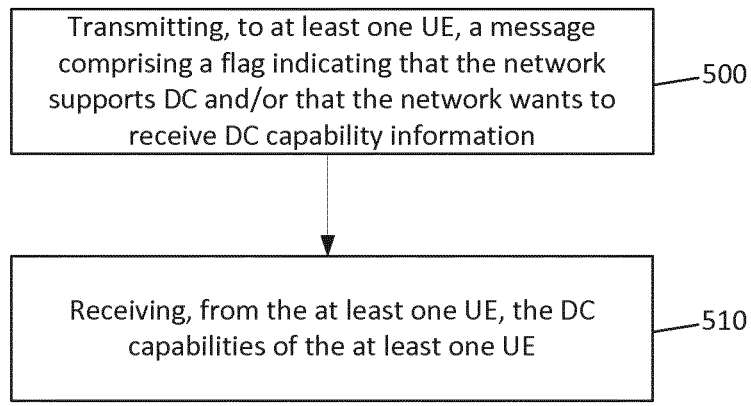
FIG. 5a illustrates a flow diagram of a method, according to one embodiment.

FIG. 5a illustrates an example flow diagram of a method according to one embodiment. In an embodiment, the method of FIG. 5a may be executed by a network node, such as a base station or eNB. The method may include, at 500, transmitting, to at least one UE, a message comprising a flag indicating that the network supports dual connectivity and/or would like to receive UE capability indications of DC support. Based on the presence of the flag, the method may also include, at 510, receiving, from the at least one UE, the dual connectivity capabilities of the at least one UE. In an embodiment, the receiving step may further include receiving a capability indication of split/SCG bearer support allowing the network to know whether the at least one UE supports dual connectivity in any band combination.

According to another embodiment, the transmitting of the message may further include transmitting the message to include a request for frequency bands or list of frequency bands used for dual connectivity by the network. In this embodiment, the receiving step may also include receiving the dual connectivity capabilities of the at least one UE for the requested frequency bands.

Figure 5B:
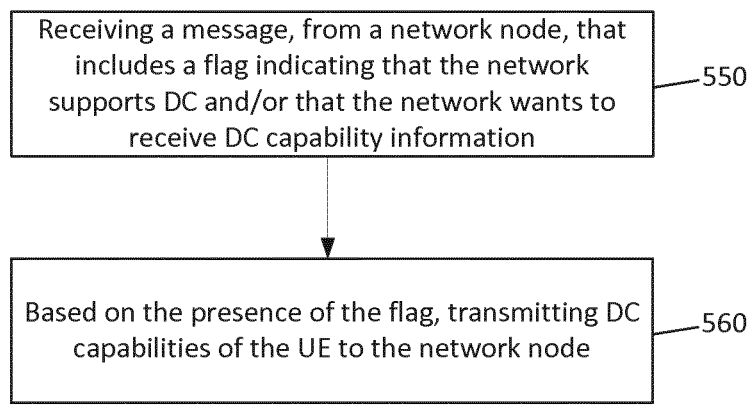
FIG. 5b illustrates a flow diagram of a method, according to another embodiment.

FIG. 5b illustrates an example flow diagram of a method according to one embodiment. In an embodiment, the method of FIG. 5b may be executed by a mobile device, such as a UE. The method may include, at 550, receiving a message, from a network node (e.g., eNB), that includes a flag indicating that the network supports dual connectivity and/or indicating that the network would like to receive UE capability indications of DC support. Based on the presence of this flag, the method may also include, at 560, transmitting dual connectivity capabilities of the UE to the network node. According to an embodiment, the transmitting step may further include transmitting a capability indication of split/SCG bearer support allowing the network to know whether the UE supports dual connectivity in any band combination.

In certain embodiments, the receiving of the message may further include receiving the message including a request for frequency bands or list of frequency bands used for dual connectivity by the network. In this embodiment, the transmitting step may also include transmitting the dual connectivity capabilities of the UE for the requested frequency bands.

In some embodiments, the functionality of any of the methods described herein, such as those illustrated in FIG. 4 or 5 discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   transmitting to at least one user equipment, by a network node, a message comprising a flag indicating that the network supports dual connectivity and/or indicating that the network would like to receive user equipment capability indications of dual connectivity (DC) support; and
   based on the presence of the flag, receiving, from the at least one user equipment, the dual connectivity capabilities of the at least one user equipment,
   wherein the transmitting further comprises transmitting the message comprising a request for frequency bands used for dual connectivity by the network node.

2. The method according to claim 1, wherein the receiving further comprises receiving a capability indication of split/secondary cell group (SCG) bearer support allowing the network node to know whether the at least one user equipment supports dual connectivity in any band.

3. The method according to claim 1, wherein, when the message comprises the requested band lists, the method further comprises receiving dual connectivity capabilities of the at least one user equipment for the requested frequency bands.

4. An apparatus, comprising:
   at least one processor; and
   at least one memory including computer program code,
   the at least one memory and computer program code configured, with the at least one processor, to cause the apparatus at least to
   transmit to at least one user equipment, by from a network node, a message comprising a flag indicating that the network supports dual connectivity and/or indicating that the network would like to receive user equipment capability indications of dual connectivity (DC) support; and
   based on the presence of the flag, receive, from the at least one user equipment, the dual connectivity capabilities of the at least one user equipment,
   wherein the message further comprises a request for frequency bands used for dual connectivity by the network node.

5. The apparatus according to claim 4, wherein the at least one memory and computer program code are configured, with the at least one processor, to cause the apparatus at least to receive a capability indication of split/secondary cell group (SCG) bearer support allowing the network node to know whether the at least one user equipment supports dual connectivity in any band.

6. The apparatus according to claim 4, wherein, when the message comprises the requested band lists, the apparatus further comprises means for receiving dual connectivity capabilities of the at least one user equipment for the requested frequency bands.

7. A method, comprising:
   receiving, by a user equipment, a message from a network node, wherein the message comprises a flag indicating that the network supports dual connectivity and/or indicating that the network would like to receive user equipment capability indications of dual connectivity support; and
   based on the presence of the flag, transmitting, to the network node, the dual connectivity capabilities of the user equipment,
   wherein the message further comprises a request for frequency bands used for dual connectivity.

8. The method according to claim 7, wherein the transmitting further comprises transmitting a capability indication of split/secondary cell group (SCG) bearer support allowing the network to know whether the user equipment supports dual connectivity in any band.

9. The method according to claim 7, wherein, when the message from the network includes the requested band lists, the method further comprises transmitting the dual connectivity capabilities of the user equipment for the requested frequency bands.

10. An apparatus, comprising:
    at least one processor; and
    at least one memory including computer program code,
    the at least one memory and computer program code configured, with the at least one processor, to cause the apparatus at least to
    receive a message from a network node, wherein the message comprises a flag indicating that the network supports dual connectivity and/or indicating that the network would like to receive user equipment capability indications of dual connectivity support; and
    based on the presence of the flag, transmit, to the network node, the dual connectivity capabilities of the apparatus,
    wherein the message further comprises a request for frequency bands used for dual connectivity.

11. The apparatus according to claim 10, wherein the at least one memory and computer program code are configured, with the at least one processor, to cause the apparatus at least to transmit a capability indication of split/secondary cell group (SCG) bearer support allowing the network to know whether the apparatus supports dual connectivity in any band.

12. The apparatus according to claim 10, wherein, when the message from the network includes the requested band lists, the apparatus further comprises means for transmitting the dual connectivity capabilities of the apparatus for the requested frequency bands.

13. A computer program, embodied on a non-transitory computer readable medium, wherein the computer program is configured to control a processor to perform a process according to claim 1.

* * * * *